Oct. 5, 1965
G. H. COTTER ETAL
3,210,523
ARC-WELDING APPARATUS
Original Filed Oct. 16, 1957
4 Sheets-Sheet 1
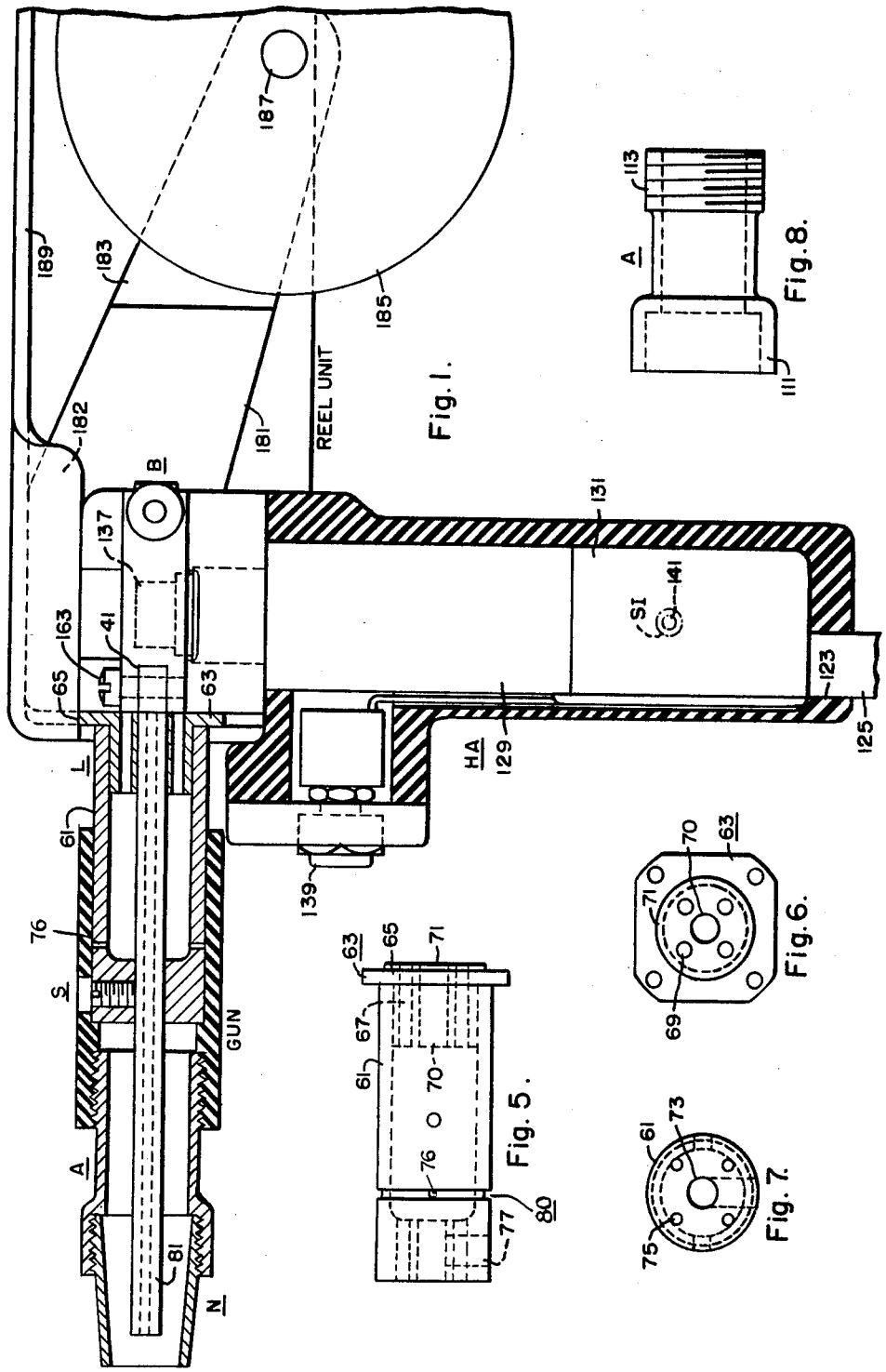

Oct. 5, 1965 G. H. COTTER ETAL 3,210,523
ARC-WELDING APPARATUS
Original Filed Oct. 16, 1957  4 Sheets-Sheet 2
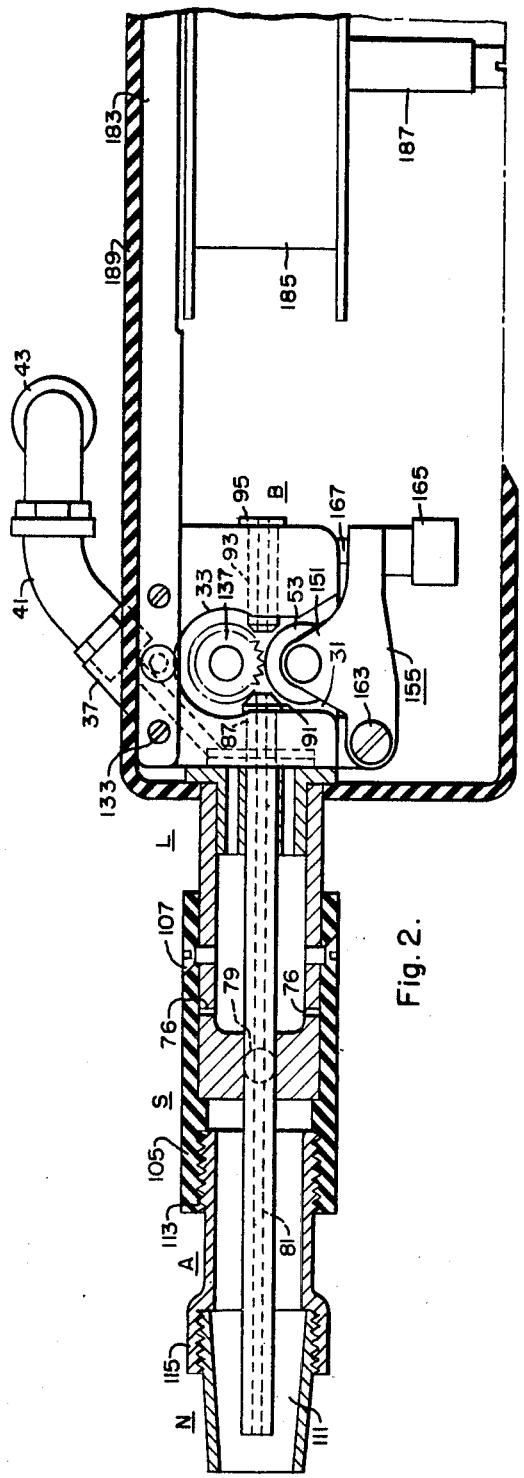
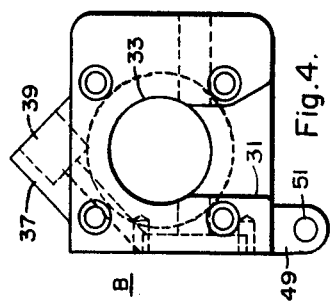
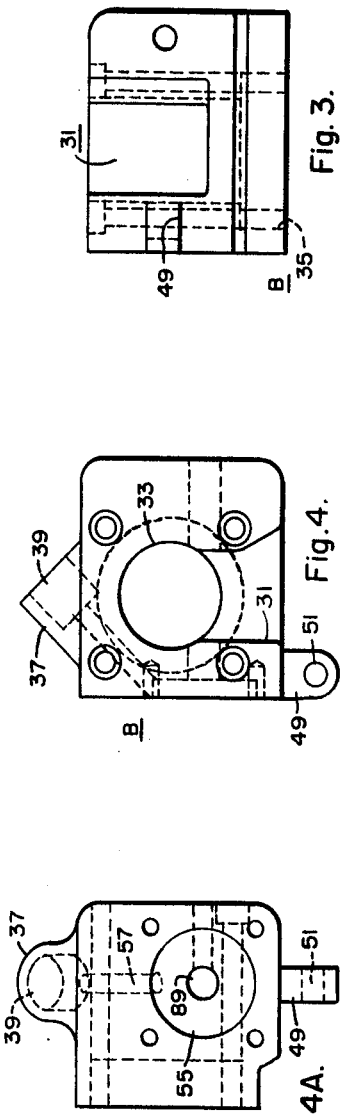
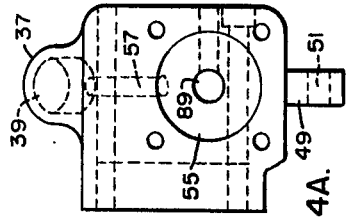

United States Patent Office 3,210,523
Patented Oct. 5, 1965

3,210,523
ARC WELDING APPARATUS
George H. Cotter, Springville, and Harry J. Bichsel, East Aurora, N.Y., assignors to Westinghouse Electric Corporation, East Pittsburgh, Pa., a corporation of Pennsylvania
Original application Oct. 16, 1957, Ser. No. 690,526, now Patent No. 3,038,990, dated Dec. 12, 1962. Divided and this application Feb. 19, 1962, Ser. No. 174,094
13 Claims. (Cl. 219—131)

This invention is a division of Serial No. 690,526, filed October 16, 1957, Patent No. 3,038,990, granted December 12, 1962, for Arc Welding Apparatus and assigned to Westinghouse Electric Corporation. This invention relates to the arc-welding art and has particular relationship to control apparatus for semi-automatic welding with a consumable electrode supplied by a welding gun.

Arc welding with a consumable electrode of relatively soft material, such as aluminum, and of relatively small diameter, for example between .020″ and .0625″, is in accordance with the teachings of the prior art facilitated by providing a gun with an electrode transmission channel which includes drive means between the electrode entrance terminal of the channel and the electrode exit terminal. It is also the practice in accordance with the teachings of the prior art to mount the motor for driving the electrode-drive means directly on the gun. So that the gun may be readily handled, it would be desirable that the motor be relatively small. But such a motor has relatively low power and starting torque, and difficulty is encountered in feeding the electrode continuously as required for a proper welding operation.

It is then an object of this invention to provide an arc welding assembly including a compact gun readily manipulated and particularly suitable for feeding an electrode of relatively soft material and of small diameter, and having drive means actuable by a small motor on the gun between the electrode entrance channel and the electrode exit channel of the gun, and also including a control circuit for controlling the welding with such a gun.

It is another object of this invention to provide such a gun and control capable of feeding the electrode with the continuity demanded for high quality work.

A further incidental object of this invention is to provide control apparatus of simple structure for consumable electrode arc welding including inching and operating means so interlocked that only one of these means can be rendered effective by the operator.

In the practice of this invention, welding apparatus is provided for welding with a consumable electrode usually in a protective atmosphere of gas with a power supply which may be selectively of the so-called constant-current or the so-called constant-potential type. Where the supply is of the constant-current type, the apparatus, according to the invention, is characterized by a control peculiarly suitable for controlling the advancement of the consumable electrode through a gun by a direct-current motor constituting part of the gun from a reel on the gun. Specifically, the motor is connected directly across the arc by a metallic connection and the speed of the electrode is stabilized by the arc voltage.

The control in this apparatus includes starting switch means and inching switch means. In accordance with another aspect of this invention, the starting and inching are interlocked through a relay having double throw contacts. This relay is set for inching in its unactuated condition and is actuated for welding, and at the same time locked out from inching, by actuation of the starting switch means.

The electrode drive motor of this apparatus is of the low-voltage type. In accordance with a further aspect of this invention, the motor is energized in the inching circuit from the welding-arc power supply through step-down transformer means and the starting circuit is also energized from step-down transformer means. Where the welding-arc power supply is of the constant-current type, the motor is energized from the voltage across the arc during welding; where the welding-arc power supply is of the constant-voltage type, the motor continues to be energized from the step-down transformer means. The operating personnel which handles the welding gun is thus always protected from high voltage.

The novel features considered characteristic of this invention are disclosed generally above. The invention itself both as to its organization and as to its method of operation together with additional objects and advantages thereof may be understood from the following description of a specific embodiment when read in connection with the accompanying drawings, in which:

FIG. 1 is a view in side elevation of a welding assembly in accordance with this invention;

FIG. 2 is a view in top elevation of the welding assembly shown in FIG. 1;

FIG. 3 is a view in side elevation of a bracket of the gun included in the assembly shown in FIG. 1;

FIG. 4 is a view in top elevation of this bracket;

FIG. 4A is a view in end elevation of this bracket;

FIG. 5 is a view in side elevation of a barrel of the gun included in the assembly shown in FIG. 1;

FIGS. 6 and 7 are views in end elevation of this barrel;

FIG. 8 is a view in side elevation of the adapter of the gun of the assembly shown in FIG. 1;

Figure 9:
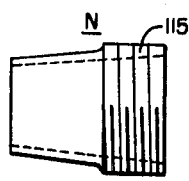
FIG. 9 is a view in side elevation of the nozzle of the gun of the assembly shown in FIG. 1.

A welding assembly in accordance with this invention includes a gun and a reel unit. The gun is of generally right-angular form including a handle HA from which a barrel assembly extends at right angles. The barrel assembly includes a bracket B (FIGS. 3 and 4), and barrel L (FIGS. 5, 6 and 7) and adapter A (FIG. 8) and a nozzle N (FIG. 9).

The bracket B is of suitable metal such as aluminum and has generally the form of a block having a relatively deep rectangular opening 31 in one of its faces. The opening 31 communicates with a cylindrical opening 33 extending along the length of the block parallel to the opening 31. The latter is counterbored at the lower end 35. A boss 37 having a threaded opening 39 therein to accommodate a pipe fitting 41 (FIG. 2) extends at an angle of about 45° from the face behind the rectangular opening 31. The fitting 41 is connected to the gas-power cable 43. The electrical conductor (not shown) of the cable is connected to the block through the fitting 41 and shielding gas is supplied through the cable to the opening 39.

Figure 15:
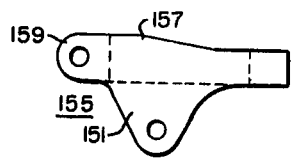
FIG. 15 is a view in top elevation of a roller bracket-arm of the gun of the assembly shown in FIG. 1.
Figure 16:
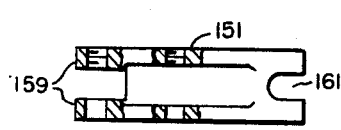
FIG. 16 is a view in side elevation of this bracket arm.

A boss 49 of generally cylindrical form having an opening 51 therein extends from the face adjacent the rectangular opening 31. This boss 49 serves as a hinge sleeve for the bracket (FIGS. 15 and 16) which carries the idler roller 15.

The bracket B has a shallow circular indentation 55 in one of the faces at right angles to the face in which the rectangular opening 31 extends and the pipe-fitting opening 39 in the boss 37 communicates with this indentation through a narrow channel 57.

The barrel L (FIGS. 5, 6 and 7) includes a shell 61 in one end of which a cap 63 is brazed. The cap has a rectangular head 65 and a stem 67, the stem engaging the inner surface of the shell. A plurality of transverse openings 69 and a central opening 70 extend through the cap. From the center of the cap a thin circular projection 71 extends. At the end opposite the cap the shell 61 includes a central opening 73 coaxial with the opening 70 and a plurality of longitudinal openings 75 around the center opening. The openings 70 and 73 accommodate an electrode guide tube 81 and the shell 61 is provided with a lateral threaded opening 77 for a set screw 79 which holds the tube 81. The barrel L is provided with a plurality of lateral openings 76 of small diameter which extend from the space within the shell 61 to an annular groove 80 on the outside surface of the shell.

The barrel L is secured to the bracket B the head 65 of the cap 63 engaging the face in which the shallow circular indentation 55 is provided. When the shell is so secured, there is a thin cylindrical space between the end 71 of the cap and the bracket B with which the narrow channel 57 in the boss 37 communicates. The barrel L and guide tube 81 are composed of conducting material.

A bushing 87 extends through a central opening 89 from the rectangular opening 31 in the bracket B through the bracket and into the shell 61. The bushing 87 is coaxial with the electrode guide tube 81. The bushing has a narrow flange 91 which engages the wall of the opening 31 and is composed of a low-friction material such as nylon. Another bushing 95 extends into the opening 93 from the face of the bracket B opposite to that to which the barrel L is secured. The latter bushing also has a narrow flange 95 engaging the face of the bracket B and is coaxial with the first bushing 87 and guide tube 81 so that an electrode threaded through the bushing 93 passes through the other end the guide tube 81 without being flexed.

Figure 10:
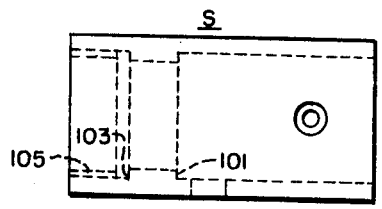
FIG. 10 is a view in side elevation of the sleeve of the gun of the assembly shown in FIG. 1.
Figure 11:
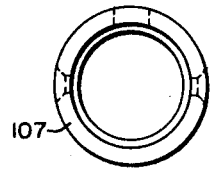
FIG. 11 is a view in end elevation of this sleeve.

The sleeve S (FIGS. 10, 11) is composed of an insulating material such as melamine and is of generally cylindrical form having a pair of shoulders 101 and 103 separated by a narrow neck near one end thereof. The portion 105 of the sleeve S extending from the shoulder 103 near this end is internally threaded. The other portion 107 of the sleeve is dimensioned to engage the barrel L firmly from the end remote from the cap 63 with the end of the barrel L engaging the shoulder 101. The portion 107 of the sleeve S has an opening 109 therein through which a tool may be inserted to loosen or tighten the set screw 79 which holds the electrode guider tube 81.

The adapter A (FIG. 8) is of generally cylindrical form having a knurled section 111 extending from a shoulder at one end and an externally threaded ring 113 extending from a shoulder at the other end. The knurled ring is internally threaded. The adaptor 111 is secured in the sleeve S with the external thread 113 engaging the internal thread 105 in the sleeve.

The nozzle N (FIG. 9) is of generally tapered form both internally and externally and has a threaded head 115. The nozzle N is secured to the adapter A, the head 115 being screwed into the knurled ring 111.

Figure 14:
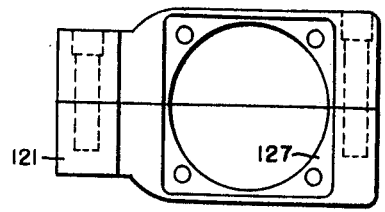
FIG. 14 is a view in end elevation of the top of this handle.
Figure 12:
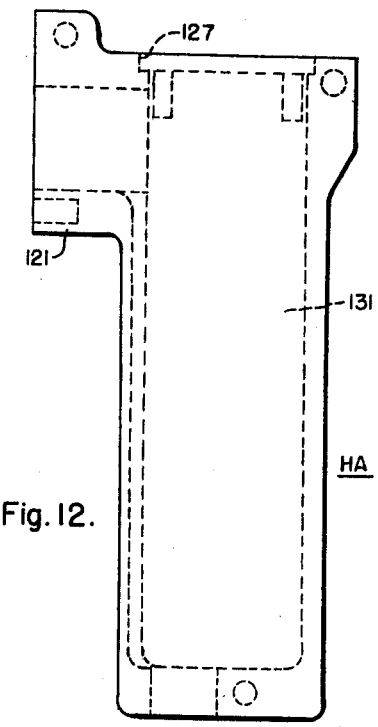
FIG. 12 is a view in side elevation of the handle of the gun of the assembly shown in FIG. 1.
Figure 13:
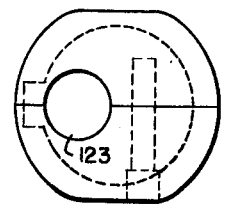
FIG. 13 is a view in end elevation of the base of this handle.

The handle HA (FIGS. 12, 13 and 14) is of generally cylindrical structure thickened at the top and having a boss 121 extending laterally from one side at the top. The handle HA is hollow but is open at the top and closed at the base except for an opening 123 through which a cable 125 carrying the control conductors extends. The opening at the top is bounded by a recess 127. A small gear motor 129, in accordance with the specific aspects of this invention preferably of the direct current type requiring a potential of the order of 24 volts, is provided for driving the electrode. In accordance with the broader aspects of this invention other motors (for example a universal motor) may be used. The motor and its gear unit are mounted together in a cylindrical casing having a narrow flange. The flange engages the recess 127 in the top of the handle HA and the motor extends into the cavity 131 in the handle.

The handle HA is secured to the lower face of the bracket B by bolts 133 extending through the bracket B parallel to the opening 31 and screwed into the periphery of the handle HA. The drive shaft of the gear motor 129 extends through the openings 35–33 at the face of the bracket B which abuts the upper rim of the handle HA and carries at its upper end, a driving roller 137 having a knurled face. Within the recess in the boss 121 a starting switch SS is provided. This switch is actuable by a button 139 extending through a cover for the recess. In addition, an inching switch SI and button 141 may be provided in the cavity 131 below the motor 129. The handle HA is of insulating material.

The idler roller 53 which cooperates with the knurled drive roller 137 is rotatably mounted between the arms 151 of a bifurcated bracket 155 (FIGS. 5, 16) pivotally suspended from the boss 49 extending from the face of the bracket B.

The projections 151 extend from strips 157 each of which terminates in hinge sleeves 159 on one side and in a slot 161 on the other side. The sleeves 159 are disposed on both sides of the base 151 and the bracket 155 and idler 53 may be pivoted about a bolt 163 from which the bracket 155 is suspended from a position outside of the opening 31 in the bracket B to a position within the opening 31 in which the idler 53 engages the knurled roller 137. The idler 53 is held in the latter position by a knurled ring 165 which screws onto a pin 167 extending through the slot 161 into the bracket B. A compression ring is attached to the knurled ring 165 and serves to hold the idler 53 firmly in the inward position.

Figure 18:
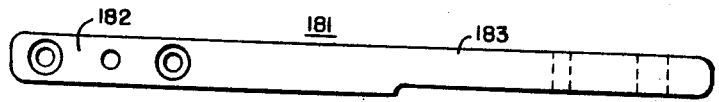
FIG. 18 is a view in top elevation of this reel bracket.
Figure 17:
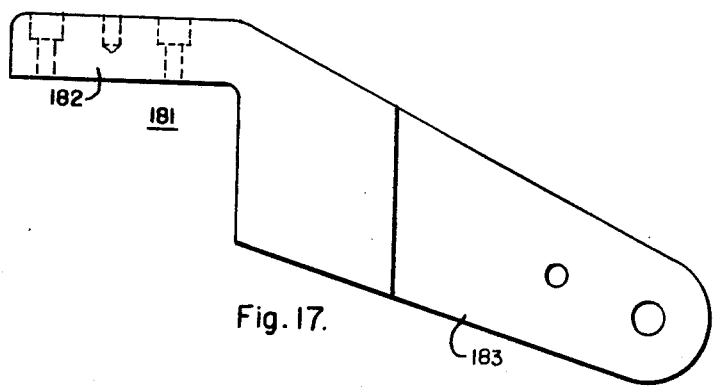
FIG. 17 is a view in side elevation of a reel bracket included in the assembly shown in FIG. 1.

The reel unit (FIGS. 17 and 18) includes a bracket 181 having a supporting strip 182 which is secured to the top of the bracket B. From this strip an arm 183 extends at an oblique angle in the end of which a reel 185 is mounted rotatably on a pin 187. A shield 189 of insulating material extends over the reel unit and bracket B. The reel 185 is composed of pressed wood; the shield 189 of insulating material.

The assembly disclosed herein may be used either with a constant current or a constant potential arc welding power supply unit. But the control circuits for the two power supply units are different.

Figure 19:
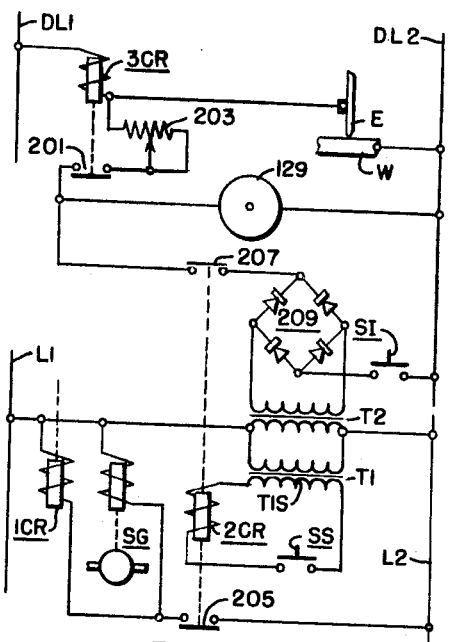
FIG. 19 is a diagram showing the control circuit of apparatus in accordance with this invention when such apparatus is used with a welding power supply unit of the constant current type.
Figure 20:
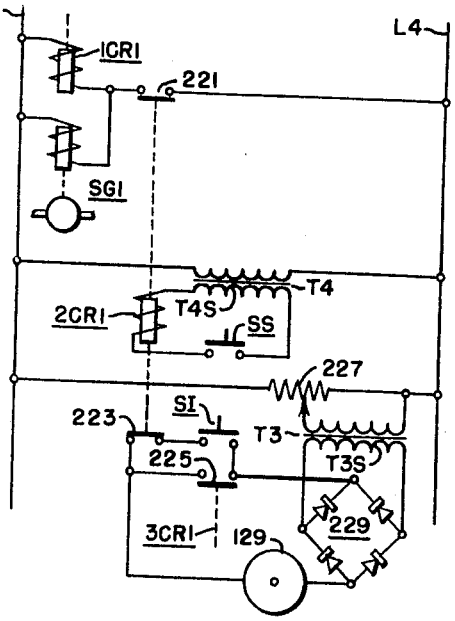
FIG. 20 is a diagram of a control circuit of the apparatus in accordance with this invention when this apparatus is used with a welding power supply unit of the constant potential type.

FIG. 19 is a circuit diagram of the control circuit when the apparatus is operated with a constant current welding power supply unit. In this case, the motor 129 derives its potential from the potential available between the electrode E and the work W during welding. Power for welding is supplied through conductors DL1 and DL2 which in the preferred practice of this invention supply direct current. Conductor DL1 is connected to the electrode and passes through the coil of a current relay 3CR. Conductor DL2 which is usually grounded is directly connected to the work W. The relay 3CR has a normally open contact 201 and the electrode drive motor 129 is connected between the electrode E and the work W through this contact 201 and through a rheostat 203 for adjusting the motor voltage. The control circuit also includes control conductors L1 and L2, a relay 1CR, a relay 2CR and a solenoid SG controlling the shielding gas. The relay 1CR (contacts not shown) is connected in the power supply unit and includes contacts which close the energization circuit for the power supply unit. The relay 2CR includes a normally open contact 205 and a normally closed contact 207. The coil of the relay 1CR and the solenoid are adapted to be connected between conductors L1 and L2 through the normally open contact 205 of the relay 2CR. The coil of the relay 2CR is adapted to be connected across the secondary T1S of a transformer T1 energized from the conductors L1 and L2 through the welding gun switch SS. The circuit including the switch SS and the coil of relay 2CR is a low voltage circuit having an open circuit voltage of about 6 volts R.M.S. For inching the motor 129 is adapted to be supplied from a rectifier 209 energized from the conductors L1 and L2 through a transformer T2 and through the normally closed contact 207.

The control circuit for the assembly when it is used with a constant-potential power supply unit is energized from conductors L3 and L4 and includes a relay 1CR1, a solenoid SG1, and a relay 2CR1. In this case also, the power-supply unit includes a current relay 3CR1 having a normally open contact 225. The relay 1CR1 like the relay 1CR has contacts (not shown) for closing the energizing circuit for the welding power supply unit. The relay 2CR1 has a normally open contact 221 and a normally closed contact 223. The relays 2CR and 2CR1 are of the double throw type contacts 205 and 207 and 223 and 221 respectively, being closed by actuation of a single arm. Thus, it is possible for only one of these contacts to be closed depending on the state of energization of the relay.

The motor is adapted to be supplied from a transformer T3 which is energized from conductors L1 and L2 through a variable transformer 227. The secondary T3S of transformer T3 supplies a rectifier 229 which is adapted to be connected across the motor 129 through the normally open contact 225 of the relay 3CR1. The rectifier 229 is also adapted to be connected across the motor 129 through the normally closed contact 223 of the relay 2CR1 and the inching switch SI. The coil of the relay 1CR1 and the solenoid SG1 are adapted to be connected between conductors L3 and L4 through the normally open contact 221 of the relay 2CR1. The coil of the relay 2CR1 is adapted to be connected across the secondary T4S of a transformer T4 through the gun switch SS. The circuit including the coil of 2CR1 and the switch SS is a low voltage circuit of the order of 6 volts R.M.S. Because the contacts 205 and 207 and 221 and 223 of relay 2CR and 2CR1 are of the double throw type the actuating of switch SS and operation of relay 2CR or 2CR1 precludes operation of the inching circuit by closing SI. If SI and SS are closed simultaneously only one of the circuits, either the welding circuit or the inching circuit, but not both, are closed.

The closing of the gun switch SS energizes the solenoid SG so that gas is supplied to the reservoir between the bracket B and barrel L. From this reservoir the gas flows through openings 69 into the barrel L and through openings 75 through the nozzle N.

A portion of the gas flows through the openings 76 to the space between the sleeve S and the barrel L. The gas in the reservoir between the barrel L and the bracket B and the gas between the sleeve S and the barrel L prevent aspiration of air with the nozzle N.

When the apparatus is to be used, a reel having electrode wound thereon is mounted on the arm 185 of the reel unit. The bifurcated bracket 155 is then moved to the position in which the idler roller 53 is outside of the opening 31 in the gun bracket B, and the electrode is threaded through the sleeve 93 in the gun bracket to a position where it engages the knurled roller 137. The bifurcated bracket 155 is then swung to a position in which the electrode is engaged between the idler roller 53 and the knurled roller 137. The inching switch SI is then actuated energizing the gun motor 129 so that the electrode is advanced through the adjacent bushing 91 and the guide tube 81 so that it projects from the end of the nozzle N. The assembly is then moved adjacent to the work W and the gun switch SS is closed. This actuates the relay 1CR or 1CR1 and the gas solenoid energizing the power supply unit. An arc is then fired between the electrode and the work by touching the electrode to the work and then removing it from the work and with the gun switch SS closed, the welding proceeds.

The electrode and the metal parts B, L of the gun are hot electrically but the operator is prevented from engaging the electrode or any of the metal parts by the insulating shield 189 and the remaining insulating parts surrounding the electrode and the gun.

In addition, the voltage impressed on the gun is in the normal operation of the apparatus, relatively low. When the supply unit is of the constant current type and the electrode and work are disengaged, the potential of the supply is across the normally open contact 201 of the relay 3CR which is in the power supply unit remote from the operator. When the electrode and the work are engaged the potential between the electrode and the work is equal to the arc drop and is of the order of 24 volts. The potential of the constant potential supply is relatively low.

While a preferred embodiment of this invention has been disclosed herein, many modifications thereof are feasible. The invention then is not to be restricted except insofar as is necessitated by the prior art.

We claim as our invention:

1. Apparatus for controlling the welding of work with a consumable electrode include electrode drive means, starting switch means, inching switch means, a relay of the double-throw type having a normally closed contact and a normally open contact and a coil, a network for starting a welding operation including said normally open contact, said network to be actuated on the closing of said normally open contact, first power supply means, means connecting in series said first power supply means, said coil and said starting switch means, second power supply means, and means connecting in series said second power supply means, said inching switch means, said normally closed contact and said electrode drive means.

2. Apparatus for controlling the welding of work with a consumable electrode including electrode drive means, normally open switch means, means connected to said switch means and responsive to the flow of current between said electrode and work for closing said switch means, an energizing circuit for said drive means including said switch means when closed, starting switch means, inching switch means, a relay of the double-throw type having a normally closed contact and a normally open contact and a coil, a network for starting a welding operation including said normally open contact, said network to be actuated on the closing of said normally open contact, first power supply means, means connecting in series said first power supply means, said coil and said starting means, second power supply means, and means connecting in series said second power supply means, said inching switch means, said normally closed contact and said electrode drive means.

3. Apparatus for controlling the welding of work with a consumable electrode comprising electrode-drive means energizable by a low potential which does not endanger operating personnel, starting switch means, inching switch means, control power-supply conductors for supplying a control potential, arc power-supply conductors for supplying welding-arc potential, potential reducing means connected to said control power-supply conductors for deriving low potential, an inching circuit for said electrode-drive means including said electrode-drive means, said inching switch and also including said potential reducing means in low potential energizing relationship in said circuit, means actuable to connect said arc power-supply conductors in energizing relationship with said electrode and work, and an actuating circuit for said last-named connecting means including said starting switch means and also including said potential reducing means in low-potential energizing relationship.

4. Apparatus for controlling the welding of work with a consumable electrode comprising electrode-drive means energizable by a low potential which does not endanger operating personnel, starting switch means, inching switch means, control power-supply conductors for supplying a control potential, arc power-supply conductors for supplying welding-arc potential, a first step-down transformer connected to said control power-supply conductors for deriving a first low potential, a second step-down transformer connected to said control power-supply conductors for deriving a second low potential, an inching circuit for said electrode-drive means including said electrode-drive means, said inching switch and also including said first transformer in first low-potential energizing relationship in said circuit, means actuable to connect said arc power-supply conductors in energizing relationship with said electrode and work, and an actuating circuit for said last named connecting means including said starting switch means and also including said second transformer in second low-potential energizing relationship.

5. Apparatus for controlling the welding of work with a consumable electrode comprising electrode-drive means, starting switch means, inching switch means, control power-supply conductors for supplying a control potential, arc power-supply conductors for supplying welding-arc potential, a first step-down transformer connected to said control power-supply conductors for deriving a first potential, a second step-down transformer connected to said control power-supply conductors for deriving a second potential, an inching circuit for said electrode-drive means including said electrode-drive means, said inching switch and also including said first transformer in first potential energizing relationship in said circuit, means actuable to connect said arc power-supply conductors in energizing relationship with said electrode and work, and an actuating circuit for said last named connecting means including said starting switch means and also including said second transformer in second potential energizing relationship.

6. Apparatus for controlling the welding of work with a consumable electrode from an arc power supply, said apparatus including an electrode-drive motor energizable by a relatively low voltage, inching switch means, starting switch means, control power-supply conductors, a step-down transformer connected to said conductors for deriving said low potential, means including said inching switch and said transformer for connecting said transformer in energizing relationship with said motor, means connected to said starting switch means and actuable by actuation of said starting switch means to connect said arc power supply in energizing relationship with said electrode and work, and means responsive to the resulting arc current for connecting said transformer in energizing relationship with said motor independently of said inching switch to impress said low potential on said motor so long as said arc current flows.

7. Apparatus for controlling the welding of work with a consumable electrode from an arc power supply, said apparatus including an electrode-drive motor energizable by a relatively low voltage, inching switch means, starting switch means, control power-supply conductors, a step-down transformer connected to said conductors independently of said electrode and work for deriving said low potential, the magnitude of said low potential being independent of the potential between said electrode and work, means including said inching switch and said transformer for connecting said transformer in energizing relationship with said motor, means connected to said starting switch means and actuable by actuation of said starting switch means to connect said arc power supply in energizing relationship with said electrode and work, and means responsive to the resulting arc current for connecting said transformer in energizing relationship with said motor independently of said inching switch to impress said low potential on said motor so long as said arc current flows.

8. Apparatus for controlling the welding of work with a consumable electrode from an arc power supply, said apparatus including an electrode-drive motor energizable by a relatively low voltage, inching switch means, starting switch means, control power-supply conductors, a step-down transformer connected to said conductors independently of said electrode and work for deriving said low potential of the constant-potential type, the magnitude of said low potential being independent of the potential between said electrode and work, means including said inching switch and said transformer for connecting said transformer in energizing relationship with said motor, means connected to said starting switch means and actuable by actuation of said starting switch means to connect said arc power supply in energizing relationship with said electrode and work, and means responsive to the resulting arc current for connecting said transformer in energizing relationship with said motor independently of said inching switch to impress said low potential on said motor so long as said arc current flows.

9. Apparatus for controlling the welding of work with a consumable electrode including electrode-drive means, starting-switch means, inching-switch means, a relay of the double-throw type having a normally-closed contact and a normally-open contact, a network for starting a welding operation including said normally-open contact, said network to be actuated on the closing of said normally-open contact, means for supplying a potential, means connecting in series in a relay actuating relationship said potential, said coil and said starting-switch means, and means connecting in series in direct-current electrode drive energizing relationship said potential, said inching switch means, said normally-closed contact and said electrode-drive means.

10. Apparatus for controlling the welding of work with a consumable electrode including electrode-drive means of the direct-current type, starting-switch means, inching-switch means, a relay of the double-throw type having a normally-closed contact and a normally-open contact, a network for starting a welding operation including said normally-open contact, said network to be actuated on the closing of said normally-open contact, means for supplying a potential, means connecting in series in a relay actuating relationship said potential, said coil and said starting-switch means, and means connecting in series in direct-current electrode drive energizing relationship said potential, said inching switch means, said normally-closed contact and said electrode-drive means.

11. An improved welding control circuit for use with a gas shielded consumable metal arc welding apparatus, including a welding current generator and a torch, said circuit comprising an A.C. power inlet adapted to be connected to an A.C. power source, a transformer means having its primary winding means connected to said power inlet, means manually energized from the secondary winding means of said transformer means causing an electrode to be advanced a desired distance prior to initiation of the arc, means also energized from the secondary winding means of said transformer means for initiating the flow of welding current from the welding current generator, and means energized by said generator for automatically initiating and controlling the electrode feed rate during welding.

12. An improved welding control circuit for use with a gas shielded consumable metal arc welding apparatus for welding work with a consumable electrode, including a welding current generator and a torch, said circuit comprising an A.C. power inlet adapted to be connected to an A.C. power source, a transformer means having its primary winding means connected to said power inlet, means manually energized from the secondary winding means of said transformer means causing an electrode to be advanced a desired distance prior to initiation of the arc, means also energized from the secondary winding means of said transformer means for initiating the flow of welding current from the welding current generator, and means energized by said generator and including said electrode and work for automatically initiating the electrode feed in welding relationship with said work during welding and for controlling the electrode feed rate of the electrode in welding relationship with said work, in dependence upon the potential between said electrode and work, after said electrode feed has been initiated.

13. Apparatus for welding working with a consumable electrode by means of an arc produced between said electrode and work including power supply means connected to said electrode and work for impressing a potential between said electrode and work to produce a welding arc therebetween, electrode-supply means, a welding gun in electrode receiving relationship with said supply means, said gun having a low voltage direct-current motor mounted thereon for advancing said electrode through said gun to said arc, and means connected to said electrode and work for impressing the voltage of said arc directly across said motor in energizing relationship with said motor, said last-named impressing means including means, conducting the full current flowing between said electrode and work and responsive to the interruption of the flow of said current between said electrode and work, for preventing the impressing of the potential of said power supply means across said motor when there is an open-circuit between said electrode and work.

References Cited by the Examiner

UNITED STATES PATENTS

| | | | |
|---|---|---|---|
| 2,073,603 | 3/37 | Beckman | 314—14 |
| 2,371,894 | 3/45 | Kennedy et al. | 314—73 X |
| 2,488,987 | 11/49 | Schmerber | 219—131 X |
| 2,606,267 | 8/52 | McElrath | 219—130 |
| 2,719,245 | 9/55 | Anderson | 219—130 X |
| 2,808,498 | 10/57 | Hudson et al. | 219—130 |
| 2,843,727 | 7/58 | Benz et al. | 219—130 |

FOREIGN PATENTS 733,667 7/55 Great Britain.

RICHARD M. WOOD, *Primary Examiner.*
JOSEPH V. TRUHE, SR., *Examiner.*